US011715065B1

(12) United States Patent
Clem

(10) Patent No.: US 11,715,065 B1
(45) Date of Patent: Aug. 1, 2023

(54) SYSTEMS AND METHODS PROVIDING VIRTUAL DISTRIBUTION CENTER INVENTORY FOR LOCALIZED FULFILMENT

(71) Applicant: Stamps.com Inc., El Segundo, CA (US)

(72) Inventor: John Roland Clem, Manhattan Beach, CA (US)

(73) Assignee: Auctane, Inc., Austin, TX (US)

( * ) Notice: Subject to any disclaimer, the term of this patent is extended or adjusted under 35 U.S.C. 154(b) by 166 days.

(21) Appl. No.: 17/027,139

(22) Filed: Sep. 21, 2020

Related U.S. Application Data

(63) Continuation of application No. 15/589,713, filed on May 8, 2017, now Pat. No. 10,817,839.

(51) Int. Cl.
  *G06Q 30/00* (2023.01)
  *G06Q 10/0875* (2023.01)
  *G06Q 30/0601* (2023.01)
  *G06Q 10/087* (2023.01)

(52) U.S. Cl.
  CPC ..... *G06Q 10/0875* (2013.01); *G06Q 30/0635* (2013.01); *G06Q 10/087* (2013.01)

(58) Field of Classification Search
  None
  See application file for complete search history.

(56) References Cited

U.S. PATENT DOCUMENTS

| 7,313,532 B2 | 12/2007 | Mariamova et al. |
| 8,160,929 B1 | 4/2012 | Park et al. |
| 8,527,373 B1 * | 9/2013 | Ricci ............ G06Q 10/087 |
| | | 705/28 |
| 8,533,053 B2 | 9/2013 | Brown et al. |
| 8,620,707 B1 | 12/2013 | Belyi et al. |
| 9,959,562 B1 | 5/2018 | Ackerman et al. |
| 10,176,446 B2 | 1/2019 | Palmer et al. |
| 2001/0018660 A1 | 8/2001 | Sehr |

(Continued)

OTHER PUBLICATIONS

Greg Girard "The e-Changing Face of Wholesale Distribution" Copyright© 1999 Supply Chain Management Review (Year: 1999).

*Primary Examiner* — Naeem U Haq
(74) *Attorney, Agent, or Firm* — Norton Rose Fulbright US LLP

(57) ABSTRACT

Systems and methods which provide localized item procurement fulfilment using virtual distribution center inventory are described. For example, stocking locations of one or more intermediaries may provide virtual distribution center inventory for use by a supplier in facilitating localized item procurement fulfilment for acquirers. A supplier may provide a web based sales platform allowing acquirers to purchase items of the supplier's goods wherein the item procurement fulfilment is configured to utilize a network of intermediaries to facilitate competitive and satisfactory delivery timeframes, such as next day, same day, and even on-demand delivery of the goods, using economy shipping options. An intermediary may share inventory data and/or account information to facilitate operation of the web based sales platform to provide transparent and seamless order and/or checkout processing for items of the supplier's goods purchased by the acquirer that are to be fulfilled out of the intermediary's stocking location.

24 Claims, 3 Drawing Sheets

(56) References Cited

U.S. PATENT DOCUMENTS

| | | | |
|---|---|---|---|
| 2002/0072983 A1* | 6/2002 | Teller | G06Q 30/0633 |
| | | | 705/26.4 |
| 2002/0077937 A1 | 6/2002 | Lyons et al. | |
| 2003/0046173 A1 | 3/2003 | Benjier et al. | |
| 2003/0093388 A1 | 5/2003 | Albright | |
| 2004/0093233 A1 | 5/2004 | Teller | |
| 2009/0187494 A1 | 7/2009 | Heath | |

* cited by examiner

SYSTEMS AND METHODS PROVIDING VIRTUAL DISTRIBUTION CENTER INVENTORY FOR LOCALIZED FULFILMENT

CROSS-REFERENCE TO RELATED APPLICATION

The present application is a continuation of and claims benefit of priority to U.S. patent application Ser. No. 15/589,713, filed on May 8, 2017, entitled "Systems and Methods Providing Virtual Distribution Center Inventory for Localized Fulfilment," the disclosure of which is incorporated herein by reference in its entirety.

TECHNICAL FIELD

The present invention relates generally to item procurement fulfilment and, more particularly, to facilitating localized item procurement fulfilment using virtual distribution center inventory.

BACKGROUND OF THE INVENTION

Goods are typically provided to various resellers to facilitate providing the goods to their ultimate end users. For example, manufacturers often provide their goods to reseller retail locations for ultimate sale to end users of the goods. Such reseller retail locations are disposed more locally with respect to the end users, and thus may facilitate ready acquisition of the goods by such end users.

A common challenge experienced by manufacturers is establishing channels for the distribution of their goods through resellers. For example, many of the resellers (e.g., independent retailers, small retail chains, etc.) are unknown to the manufacturer and thus the opportunity for establishing a channel for distributing the manufacturer's goods though any such reseller may go unrealized, despite their being the potential for mutual benefit to the manufacturer and reseller were goods to be provided through these resellers. Accordingly, manufacturers often offer their goods directly to end users, such as through a web based direct sales platform.

Although providing a means by which manufactures may expose their goods to end users, manufacturers directly providing goods to end users is not without disadvantage. For example, the manufacturers' origination location for fulfilling orders to end users is more often than not disposed remotely (often very remotely, such as in a different state or country) with respect to the end users. Accordingly, delivery of the goods to an end user having used a manufacturer's direct channel between the manufacturer and end user, may require a significant amount of time (e.g., days or weeks). Such remotely originated shipping of goods is particularly problematic in the environment of web based direct sales, such as where end users of goods from throughout a large geographic area may interface with a manufacturer's web based direct sales platform to purchase goods. In today's world of online marketplaces offering next day, same day, and even on-demand or near on-demand (e.g., 2 hour, 1 hour, and even less than 1 hour) delivery of goods, such remote origination of goods either provides unsatisfactory/uncompetitive delivery timeframes (e.g., where economy shipping options are utilized) or require cost prohibitive/uncompetitive shipping services (e.g., where overnight or priority shipping options are utilized). Moreover, a manufacturer offering their goods directly to end users, avoiding the reseller network, tends to discourage resellers from establishing channels for the distribution of that manufacturer's goods due to a fear by resellers that their time and expense in stocking goods for local availability to the end users will be undercut by direct sales to those end users by the manufacturer.

BRIEF SUMMARY OF THE INVENTION

The present invention is directed to systems and methods which provide localized item procurement fulfilment using virtual distribution center inventory. In accordance with embodiments of the invention, manufacturers and other sources of goods (collectively referred to herein as suppliers) cooperate with resellers and other distributers (collectively referred to herein as intermediaries) to utilize inventory of the suppliers' goods held at the intermediaries' various retail, warehouse, or other distributed locations (collectively referred to herein as stocking locations) for providing localized item procurement fulfilment to end users or other procurers of items (collectively referred to herein as acquirers). Accordingly, stocking locations of one or more intermediaries may provide virtual distribution center inventory for use by a supplier in facilitating localized item procurement fulfilment for acquirers.

A supplier of embodiments of the invention provides their goods to intermediaries that stock items at one or more stocking locations for later acquisition by acquirers. For example, an intermediary may stock various items of a supplier's goods at the intermediary's retail location for sale to acquirers in the normal course of the intermediary's business. Additionally or alternatively, an intermediary may stock items of a supplier's goods at a warehouse or other distribution facility, such as for later distribution to the intermediary's retail locations, to provide bulk sales to acquirers, or for other goods based transactions of the intermediary's business. It should be appreciated that such stocking locations, whether comprising retail locations, distribution facilities, etc., are likely to be distributed geographically with respect to the manufacturers' origination location, and thus may each be disposed more locally with respect to some portion of the population of potential acquirers than is the manufacturers' origination location.

In addition to providing their goods to intermediaries that stock items for procuring by acquirers, a supplier of embodiments also provides means by which acquirers may interact directly with the supplier to procure the manufacturer's goods. For example, a supplier may provide a web based sales platform (e.g., an electronic commerce or "e-commerce" site) allowing acquirers to purchase items of the suppliers goods. The item procurement fulfilment provided according to embodiments of the invention, however, is configured to utilize a network of intermediaries to benefit the supplier and acquirer by facilitating highly competitive and satisfactory delivery timeframes, such as next day, same day, and even on-demand (e.g., 2 hour, 1 hour, and even less than 1 hour) delivery of the goods, using economy shipping options (e.g., standard rate postal services shipped locally to the acquirers, delivery via ride share services such as UBER and LYFT, local currier services, delivery by intermediary personnel, etc.). Additionally or alternatively, item procurement fulfilment provided according to embodiments of the invention allows acquirer pick up of items of the supplier's goods at an intermediary stocking location, at a locker or other pickup point, etc. local to the acquirer at the convenience of the acquirer. Moreover, the item procurement fulfilment provided according to embodiments of the invention is configured to benefit the intermediary by moving items of the supplier's goods in the intermediary's inventory to acquirers while including the intermediary in the transaction (e.g., providing the sale of the item through the intermediary, exposing the intermediary to new customers, etc.) and thus benefits the supplier and intermediary by encouraging intermediaries to establish channels for the distribution of the supplier's goods.

In operation of embodiments of the invention, an intermediary elects to cooperate with a supplier in providing localized item procurement fulfilment using virtualized distribution center inventory. Such cooperation may not only include an agreement to make items of the supplier's goods from one or more stocking locations of the intermediary available for use in localized item procurement fulfilment, but may include sharing of information, providing integration of one or more systems, etc. to facilitate localized item procurement fulfilment. For example, an intermediary may share inventory data (e.g., providing real-time access to the intermediary's point of sale (POS) system) to facilitate operation of the web based sales platform to provide transparent and seamless order processing wherein items of the supplier's goods stocked at an intermediary's stocking location disposed locally to the acquirer are known and thus this information may be leveraged in performing the transaction. Additionally or alternatively, an intermediary may share account information (e.g., deposit account information, electronic funds transfer information, online payment account information, etc.) such as to enable a checkout process for the supplier's sale of goods using the web based sales platform to direct payment to the intermediary's account for items of the supplier's goods purchased by the acquirer that are to be fulfilled out of the intermediary's stocking location.

As can be appreciated from the foregoing, operation according to embodiments of the invention utilizes inventory stocked by intermediaries as virtual distribution center inventory for transactions initiated via a supplier's platform. Using such distributed inventory of the supplier's goods, fulfilment of the items may nevertheless be localized with respect to an acquirer, despite the supplier's own origination location for fulfilling orders being remote with respect to the acquirer. Accordingly, embodiments provide a solution in which localized item procurement fulfilment using virtual distribution center inventory is provided that facilitates suppliers exposing their goods to acquires that may not otherwise have been exposed to the goods through an intermediary while offering rapid, competitive fulfilment to the acquirer and satisfying needs of the intermediary.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
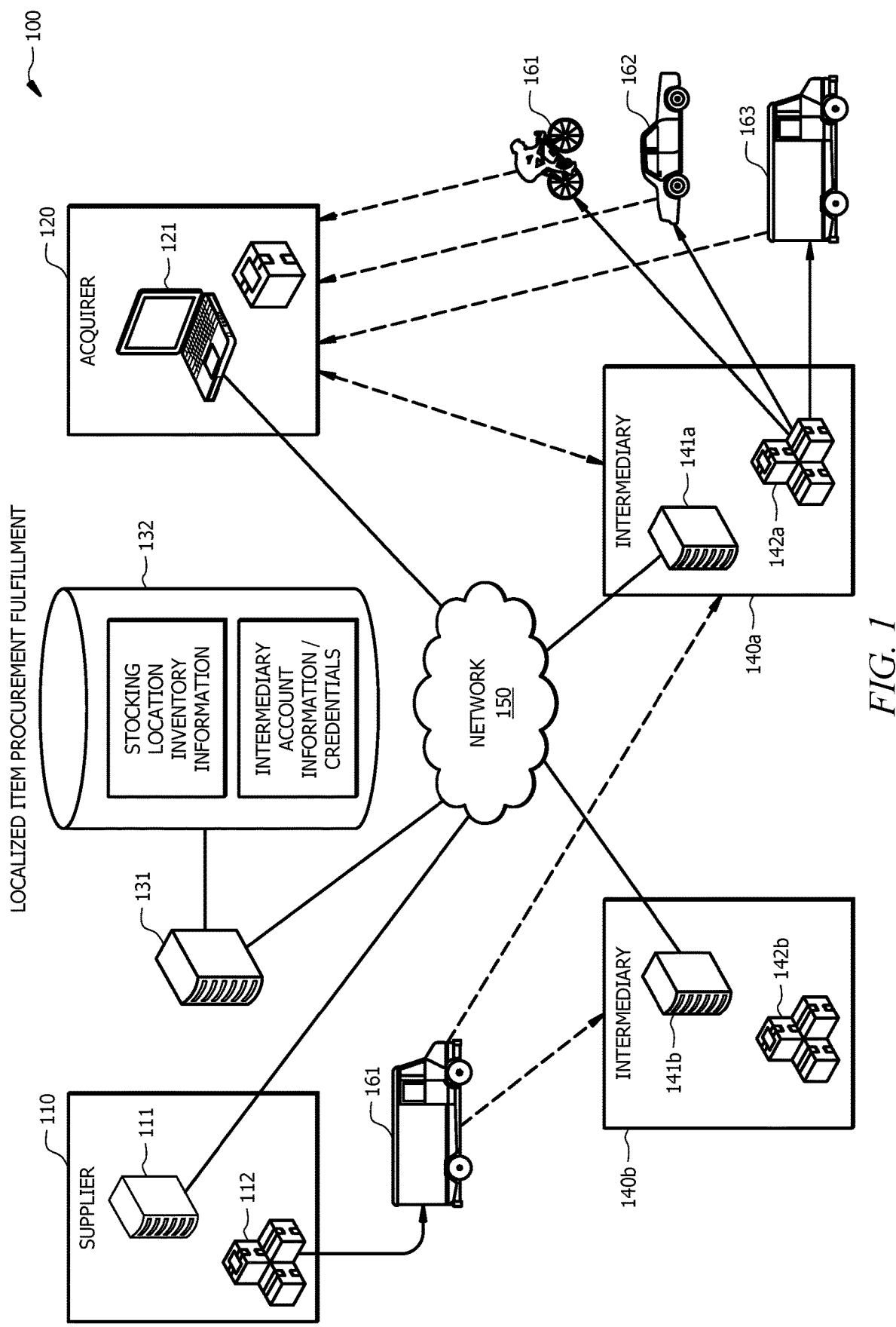
FIG. 1 shows a system configured to provide localized item procurement fulfilment using virtual distribution center inventory according to embodiments of the present invention.

FIG. 1 shows a system (shown as system 100) configured according to embodiments of the present invention to provide localized item procurement fulfilment using virtual distribution center inventory. In particular, system 100 of the illustrated embodiment is configured to enable suppliers to utilize inventory of the suppliers' goods held at intermediaries' various stocking locations for providing localized item procurement fulfilment to acquirers. In operation according to embodiments of system 100 illustrated in FIG. 1, an acquirer (e.g., end user, buyer, consumer, etc.) may utilize a terminal or other device (e.g., acquirer system 121) to interact with a supplier (e.g., manufacturer, importer/domestic source, etc.) through a web site or other interface (e.g., as may be provided by supplier system 111 accessible via network 150) to select, purchase, or otherwise seek to procure one or more items of the suppliers goods. System 100 of the illustrated embodiment is configured (e.g., including localized item procurement fulfilment system 131) to utilize inventory stocked by intermediaries at one or more intermediary stocking location (e.g., intermediary stocking locations 140a and 140b) as virtual distribution center inventory for goods procurement transactions conducted with an acquirer. Accordingly, although the supplier's origination location for fulfilling orders (e.g., supplier location 110) is disposed remotely with respect to the acquirer (e.g., acquirer location 120), fulfilment of items is localized with respect to the acquirer using the distributed inventory of the supplier's goods at the intermediary's stocking location (e.g., intermediary stocking location 140a).

In providing the foregoing localized item procurement fulfilment functionality using virtual distribution center inventory, system 100 of embodiments herein provides a system by which suppliers of goods and their network of intermediaries may cooperate to provide localized item procurement fulfilment as part of a transaction initiated by an acquirer using the supplier's web site or other interface. Accordingly, system 100 of embodiments comprises one or more processor-based systems operable to provide functionality in accordance with the concepts described herein.

Supplier system 111 may, for example, comprise one or more processor-based systems (e.g., web server, electronic commerce server, computer workstation, enterprise computer network, user interface portal, etc.) in communication with network 150, such as for providing communication with any or all of acquirer system 121, localized item procurement fulfilment system 131, intermediary systems 141a and 141b, etc. Supplier system 111 of embodiments is configured to conduct item procurement transactions (e.g., e-commerce sales transactions, such as may include order processing, payment processing, remittance to intermediaries or other parties for items sold, shipping/delivery label and/or other documentation generation, etc.) with various acquirers of the supplier's goods (e.g., via acquirer system 121), to obtain information (e.g., via localized item procurement fulfilment system 131 and/or appropriate ones of intermediary systems 141a and 141b) regarding inventory of items of the suppliers goods stocked at intermediary stocking locations, and to initiate localized item procurement fulfilment (e.g., in cooperation with acquirer system 120, localized item procurement fulfilment system 131 and/or appropriate ones of intermediary systems 140a and 140b). Accordingly, supplier system 111 of embodiments may comprise a processor-based system operable under control of an instruction set or instruction sets defining operation as described herein. Supplier system 111 of embodiments comprises one or more processors (e.g., a CORE or PENTIUM processor available from Intel, Inc.) and requisite processor readable (e.g., computer readable) memory (e.g., random access memory (RAM), read only memory (ROM), flash memory, disk memory, solid state drive (SSD) memory, optical memory, and/or the like) and input/output components (e.g., display, network interface card (NIC), keyboard, digital pointer, printer, and/or the like) coupled to a processor of the one or more processors via a data bus. It should be appreciated that the components of supplier system 111 may be implemented as a single system, such as a single server, or as a distributed system, such as a server farm, a number of host systems disposed remotely with respect to each other, etc. Supplier system 111 of embodiments may be integrated with one or more other systems providing functionality herein, such as localized item procurement fulfilment system 131. Moreover, it should be appreciated that although one supplier system is shown in FIG. 1, any number and combination of configurations of supplier systems, whether for a same or different suppliers, may be utilized according to embodiments.

Acquirer system 121 of embodiments herein provides a system by which an acquirer of goods may interact with a supplier of the goods via network 150 to facilitate procuring goods by the acquirer whereby localized item procurement fulfilment may be provided according to the concepts herein. Additionally or alternatively, acquirer system 121 of embodiments is configured to perform functionality (e.g., in cooperation with one or more of supplier system 111, localized item procurement fulfilment system 131, and/or appropriate ones of intermediary systems 141a and 141b) facilitating localized item procurement fulfilment in accordance with the concepts herein. Accordingly, acquirer system 121 of embodiments may comprise any number of system configurations used by a user for selecting, purchasing, or otherwise requesting one or more goods to be procured by the acquirer from a supplier and/or for facilitating localized item procurement fulfilment with respect to the one or more goods. For example, acquirer system 121 may comprise a general purpose processor-based system (e.g., personal computer (PC) having a processor, memory, suitable input/output (I/O) functionality, and operating system (OS)) operating under control of an instruction set (e.g., a client application such as a PC client, web client, mobile client, tablet client, etc.) to interface with supplier system 111 and provide operation as described herein. Additionally or alternatively, acquirer system 121 may comprise a processor-based mobile device such as a smart phone, a tablet device, a personal digital assistant (PDA), an Internet appliance (e.g., a processor-based electronic commerce appliance), etc., having the requisite instruction set and processing and I/O resources. It should be appreciated that although one acquirer system is shown in FIG. 1, any number and combination of configurations of acquirer systems, whether for a same or different acquirers, may be accommodated according to embodiments.

Intermediary systems 141a and 141b of embodiments herein comprise one or more processor-based systems (e.g., web server, computer workstation, enterprise computer network, user interface portal, etc.) in communication with network 150, such as for providing communication with any or all of supplier system 111, acquirer system 121, localized item procurement fulfilment system 131, other ones of intermediary systems 140a and 140b, etc. Intermediary systems 141a and 141b of embodiments are configured to provide information management functions with respect to the intermediary's operations (e.g., configured to provide enterprise resource planning (ERP) functionality, POS functionality, inventory management, payment processing, etc.) and/or to facilitate localized item procurement fulfilment in accordance with the concepts herein. For example, intermediary systems 141a and 141b may be configured to provide information (e.g., to supplier system 111 and/or localized item procurement fulfilment system 131) regarding inventory of items of the suppliers goods stocked at one or more associated intermediary stocking locations (e.g., intermediary stocking locations 140a and 140b) and/or regarding intermediary account information (e.g., information regarding an account suitable for receiving payment for items procured using localized item procurement fulfilment). Additionally or alternatively, intermediary systems 141a and 141b of embodiments are configured to perform functionality (e.g., in cooperation with one or more of supplier system 111, acquirer system 121, localized item procurement fulfilment system 131, and/or other ones of intermediary systems 141a and 141b) facilitating localized item procurement fulfilment in accordance with the concepts herein. Accordingly, intermediary systems 141a and 141b of embodiments may comprise one or more processor-based systems (e.g., web server, POS system, computer workstation, enterprise computer network, user interface portal, etc.) in communication with network 150 operable under control of an instruction set to provide operation as described herein. Intermediary systems 141a and 141b of embodiments comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. It should be appreciated that although one intermediary system is shown with respect to each intermediary stocking location illustrated in FIG. 1, any number and combination of configurations of intermediary systems may be provided with respect to one or more such stocking locations. Moreover, intermediary systems of embodiments may be integrated with one or more other systems providing functionality herein, such as supplier system 111 and/or localized item procurement fulfilment system 131. Various of the intermediary systems may be for a same or different suppliers according to embodiments.

Localized item procurement fulfilment system 131 of embodiments herein provides a processor-based system implementing logic for facilitating localized item procurement fulfilment as may be initiated in association with item procurement transactions performed by supplier system 111. For example, localized item procurement fulfilment system 131 of embodiments is configured to analyze information (e.g., provided by supplier system 111 and/or appropriate ones of intermediary systems 141*a* and 141*b*) regarding inventory of items of the suppliers goods stocked at intermediary stocking locations for determining if localized item procurement fulfilment is available with respect to a transaction, to identify and/or select one or more intermediary stocking locations for providing virtual distribution center inventory for a transaction, to facilitate pick up or delivery from one or more selected intermediary stocking locations of items for a transaction, etc. Localized item procurement fulfilment system 131 of embodiments may utilize account information (e.g., deposit account information, electronic funds transfer information, online payment account information, etc.) for intermediaries to facilitate payment to the intermediary's account for items of the supplier's goods purchased by the acquirer that are to be fulfilled out of the intermediary's stocking location. Accordingly, localized item procurement system 131 of embodiments comprises one or more processor-based systems (e.g., web server, control portal, etc.) in communication with supplier system 111, acquirer system 121, and/or intermediary systems 141*a* and 141*b* via network 150. Localized item procurement system 131 of embodiments comprises one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus configured to provide operation as described herein. It should be appreciated that the components of localized item procurement fulfilment system 131 may be implemented as a single system, such as a single server, or as a distributed system, such as a server farm, a number of systems disposed remotely with respect to each other, etc. Localized item procurement fulfilment system 131 of embodiments may be integrated with one or more other systems providing functionality herein, such as supplier system 111 and/or any or all of intermediary systems 141*a* and 141*b*. Moreover, it should be appreciated that although one localized item procurement fulfilment system is shown in FIG. 1, any number and combination of configurations of localized item procurement fulfilment systems may be utilized according to embodiments.

Network 150 provides communication links with respect to and between supplier systems, acquirer systems, localized item procurement fulfilment systems, and/or intermediary systems for facilitating operation as described herein. Accordingly, the links of network 150 are operable to provide suitable communication links for facilitating cooperative interaction and data transfer as described with respect to embodiments of the invention. Network 150 of embodiments may thus comprise one or more of a local area network (LAN), metropolitan area network (MAN), wide area network (WAN), wireless LAN (WLAN), the Internet, intranet, extranet, cable transmission system, cellular communication network, the public switched telephone network (PSTN), and/or the like.

Figure 2:
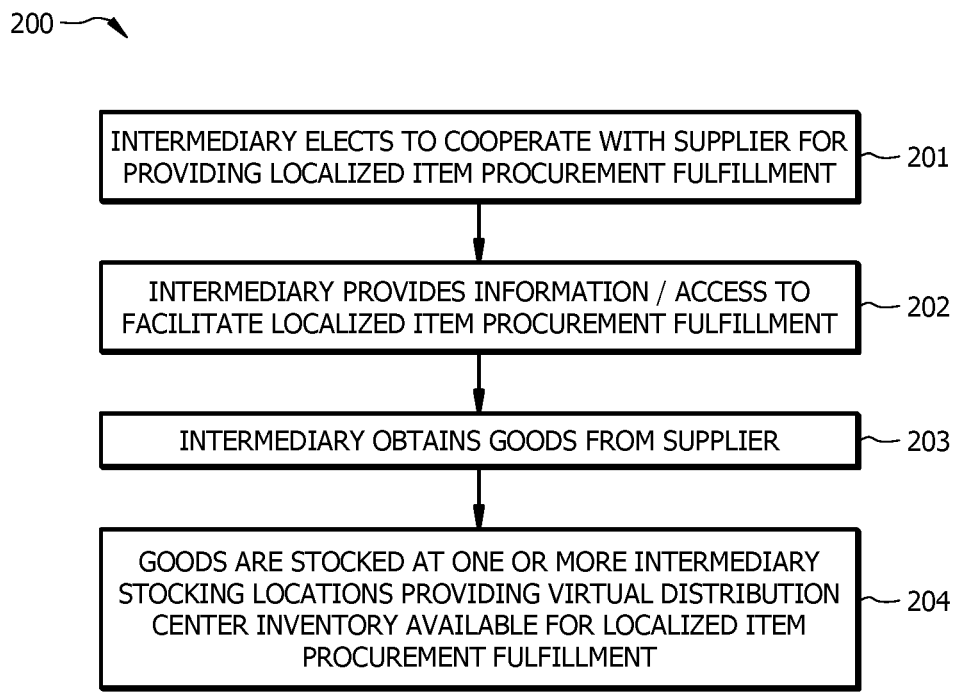
FIG. 2 shows a high level flow diagram of operation to establish virtual distribution center inventory for use in localized item procurement fulfilment according to embodiments of the present invention.
Figure 3:
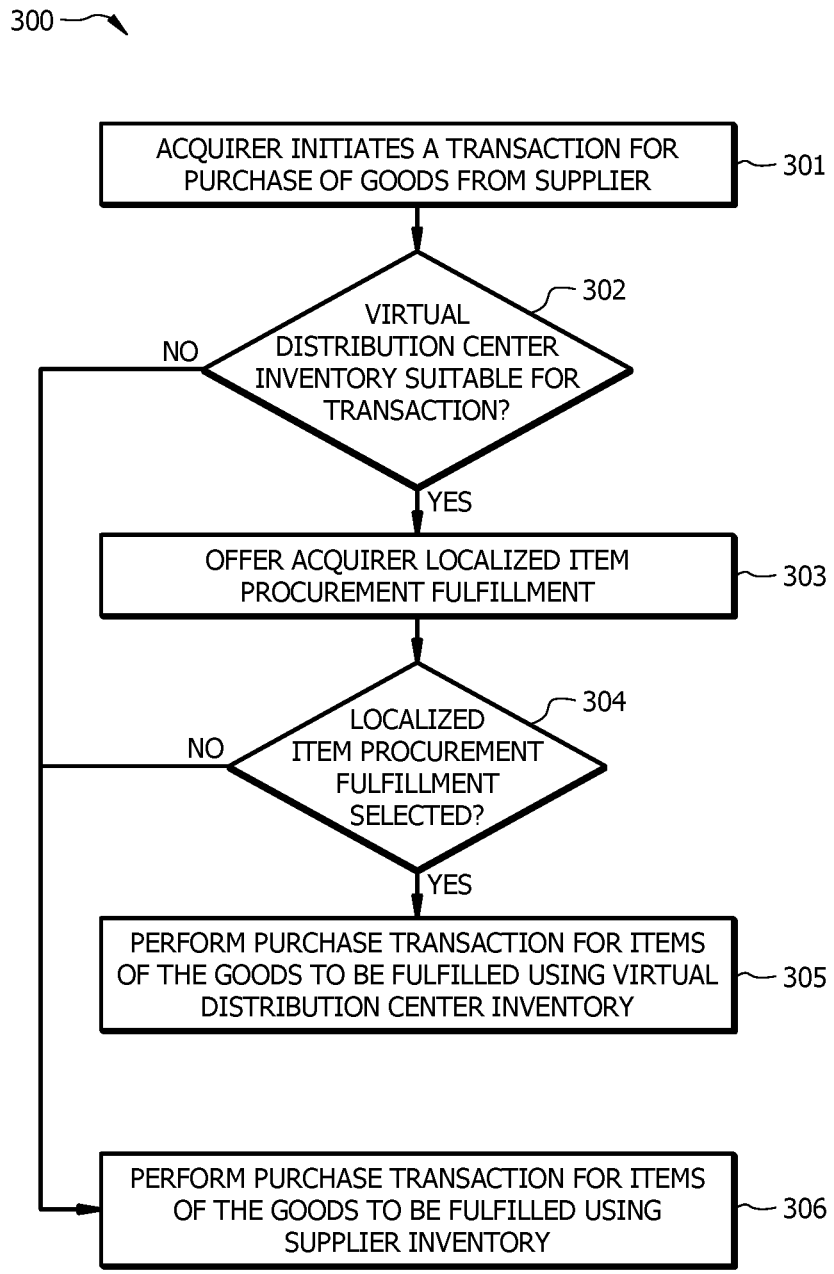
FIG. 3 shows a high level flow diagram of operation to perform localized item procurement fulfilment functionality according to embodiments of the invention.

Having described the localized item procurement fulfilment system configuration illustrated in FIG. 1, operation of system 100 to provide localized item procurement fulfilment with respect to one or more items to be procured by an acquirer according to embodiments of the invention is described with reference to FIGS. 2 and 3. In particular, FIG. 2 provides an exemplary high level flow diagram showing operation according to embodiments with respect to establishing virtual distribution center inventory for use in localized item procurement fulfilment. FIG. 3 provides an exemplary high level flow diagram showing operation according to embodiments with respect to logic of system 100 performing localized item procurement fulfilment functionality.

FIG. 2 shows flow 200 providing operation according to embodiments of the invention for establishing virtual distribution center inventory available for localized item procurement fulfilment in accordance with the concepts herein. In operation of the illustrated embodiments of flow 200, an intermediary elects to cooperate with a supplier in providing localized item procurement fulfilment at block 201. For example, personnel of the intermediary may interface with suppler system 111 and/or localized item procurement fulfilment system 131, such as using one or intermediary systems 141*a* or 141*b*, and indicate an election to allow items of the supplier's goods stocked at one or more intermediary stocking locations to be utilized as virtual distribution center inventory in fulfilling orders made by acquires to the supplier. In electing to cooperate in providing localized item procurement fulfilment, the intermediary may elect to provide cooperative participation with respect to all goods obtained by the intermediary from the supplier (e.g., all individual items without minimum inventory reserves, all types of items, etc.) and/or with respect to all stocking locations of the intermediary (e.g., all locations having items for which cooperative participation is elected). Alternatively, the intermediary may elect to provide cooperative participation with respect to some subset of goods obtained by the intermediary from the supplier (e.g., individual items stocked in quantities in excess of a minimum threshold, particular types of items, items experiencing inventory turnover rates in excess of a threshold period, etc.) and/or with respect to some subset of stocking locations of the intermediary (e.g., only retail locations having items for which cooperative participation is elected, locations in particular geographic areas, locations experiencing inventory turnover rates in excess of a threshold period, etc.).

The intermediary having elected to cooperate with a supplier in providing localized item procurement fulfilment, flow 200 of the illustrated embodiment proceeds to block 202 wherein the intermediary provides information, resource access, etc. (e.g., as may include enabling an application programming interface (API) for accessing one or more intermediary system, providing access credentials and other useful information, and/or the like) for facilitating the localized item procurement fulfilment. For example, to facilitate use of items of the supplier's goods from one or more stocking locations of the intermediary in localized item procurement fulfilment according to embodiments herein, supplier system 111 and/or localized item procurement fulfilment system 131 may utilize information regarding the intermediary's inventory of the supplier's goods at particular stocking locations, information regarding one or more intermarry accounts, the physical location of the participating stocking locations, the shipping services available from the participating stocking locations, the capabilities and/or timeline for intermediary personnel preparing items of the goods for providing to an acquirer (e.g., time for picking, packaging, make-ready, shipping, etc.), shipper pick-up schedules at the participating stocking locations, the hours of operation of the intermediary stocking location, and the like. Additionally or alternatively, to facilitate use of items of the supplier's goods from one or more stocking locations of the intermediary in localized item procurement fulfilment according to embodiments herein, supplier system 111 and/or localized item procurement fulfilment system 131 may utilize access to various ones of the intermediary's resources, such as access to information management systems of the intermediary (e.g., inventory, accounting, database, POS, and/or ERP systems, such as may be used for obtaining inventory information, for checkout process integration, for providing remittance for items of the goods sold to acquirers by the supplier, etc.), one or more accounts of the intermediary (e.g., deposit account, online payment account, etc., such as may be used for remittance for items of the goods sold to acquirers by the supplier), devices of the intermediary (e.g., printers, shipping label generators/printers, pick-ticket schedulers, etc., such as may be used for providing picking and packing instructions, invoices, shipping labels, etc.), and the like. From the foregoing, it can be appreciated that operation at block 202 of embodiments may thus provide information to supplier system 111 and/or localized item procurement fulfilment system 131 (e.g., as may be stored in one or more database, such as database 132) and/or enable access to one or more of intermediary's resources to supplier system 111 and/or localized item procurement fulfilment system 131 for use in localized item procurement fulfilment herein.

At block 203 of the embodiment of flow 200 illustrated in FIG. 2, the intermediary obtains goods from the supplier. For example, personnel of the intermediary may utilize one or more of intermediary systems 141a and 141b to interface with a wholesale order processing application of supplier system 111 to order items of goods 112 available from the supplier. Items of goods 112 purchased from the supplier by the intermediary may, for example, be shipped from supplier location 110 to appropriate ones of intermediary locations 140a and 140b (e.g., as designated by the intermediary in their order of the items) via any number of suitable means, such as shipping service provider 161 (e.g., United States postal service (USPS), United Parcel Service (UPS), Federal Express (FedEx), commercial trucking company, air freight service, rail-freight company, etc.).

The intermediary may thus be provided with stock of one or more items of the supplier's goods at stocking locations 140a and/or 140b (e.g., items of goods 142a stocked at intermediary stocking location 140a and items of goods 142b stocked at intermediary stocking location 142b) at block 204 of flow 200. For example, an intermediary may stock various items of a supplier's goods at one or more of intermediary stocking locations 140a and 140b for sale to acquirers in the normal course of the intermediary's business, for later distribution to the intermediary's retail locations, to provide bulk sales to acquirers, or for other goods based transactions of the intermediary's business. However, in association with the intermediary having elected to cooperate with the supplier in providing localized item procurement fulfilment, items of goods 142a and/or 142b stocked at a respective one of intermediary stocking locations 140a and 140b are available to be utilized as virtual distribution center inventory in fulfilling orders made by acquires to the supplier according to concepts of the present invention.

Operation at block 204 may, in addition to the act of holding the goods for availability to acquirers, include operation to facilitate the use of the stocked items for localized item procurement fulfilment. For example, one or more of intermediary systems 141a and 141b may from time to time provide inventory information to supplier system 111 and/or localized item procurement fulfilment system 131 for enabling localized item procurement fulfilment functionality thereof to have information regarding available virtual distribution center inventory. In operation according to embodiments, one or more of intermediary systems 141a and 141b may utilize the aforementioned API, or other suitable interface, to provide real-time or near real-time inventory information to supplier system 111 and/or localized item procurement fulfilment system 131 (e.g., an inventory system operable upon intermediary systems 141a and/or 141b may provide information regarding the current quantities of particular items of the supplier's goods stocked at one or more intermediary stocking locations available as virtual distribution center inventory as transactions are processed affecting the quantities). Accordingly, supplier system 111 and/or localized item procurement fulfilment system 131 may be provided with inventory information, for facilitating localized item procurement fulfilment using virtual distribution center inventory provided by the intermediary's inventory, through implementation of computer resources providing improved resource utilization, communication efficiency, and data timeliness (e.g., as compared to an implementation requiring polling of intermediary systems when determinations regarding fulfilment are being made by the supplier system and/or localized item procurement fulfilment system).

Supplier location 110 of FIG. 1 may be disposed remotely with respect to acquirer location 120, and thus delivery of goods from the supplier to the acquirer (e.g., where the acquirer purchases goods directly from the supplier, such as using a web based direct sales platform) may require a significant amount of time (e.g., days or weeks). However, intermediary stocking locations of embodiments herein are likely to be distributed geographically with respect to supplier location 110, and thus may each be disposed more locally with respect to some portion of the population of potential acquirers than is the supplier location. Accordingly, one or more of intermediary stocking locations 141a and 141b may be disposed locally, or sufficiently near, to acquirer location 120 to provide advantages in originating items of the supplier's goods from such intermediary stocking locations for procurement fulfilment with respect to the acquirer.

For example, in some situations, intermediary stocking location 141a may be disposed very near acquirer location 120 (e.g., within 1 mile, such as being disposed in the same neighborhood, on the same block, or in the same building), enabling the acquirer to readily pick up items from the intermediary stocking location personally, personnel of the intermediary stocking location providing delivery of items to the acquirer location, or a ride sharing service to provide delivery of items to the acquirer location. The foregoing fulfilment options facilitate providing same day, on-demand (e.g., less than 1 hour), and near on-demand (e.g., 2 hour or 1 hour) delivery/acquisition of goods. Further, situations in which the intermediary stocking location is disposed very near the acquirer location may enable a shipping service provider to provide local delivery service of items to the acquirer location without traversing a centralized shipping service provider hub, thus facilitating providing relatively rapid (e.g., overnight and even same day) and economical (e.g., local or intra-zone shipping rates, without surcharge for expedited delivery) delivery of goods to the acquirer location.

In other situations, intermediary stocking location 141a may, for example, be disposed near acquirer location 120 (e.g., within 10 miles but more than 1 mile away, such as being disposed in the same town, in the same borough, on the same base or compound, or within the same ZIP code), providing an opportunity for the acquirer to pick up items from the intermediary stocking location personally or personnel of the intermediary stocking location providing delivery of items to the acquirer location, and enabling a ride sharing service to provide delivery of items to the acquirer location. The foregoing fulfilment options facilitate providing same day and near on-demand (e.g., 2 hour or 1 hour) delivery/acquisition of goods. Further, situations in which the intermediary stocking location is disposed near the acquirer location may enable a shipping service provider to provide local delivery service of items to the acquirer location without traversing a centralized shipping service provider hub or to otherwise provide economic delivery services to the acquirer location with respect to items, thus facilitating providing relatively rapid (e.g., overnight and even same day) and economical (e.g., local or intra-zone shipping rates, without surcharge for expedited delivery) delivery of goods to the acquirer location.

In still other situations, intermediary stocking location 141a may, for example, be disposed relatively near acquirer location 120 (e.g., within 100 miles but more than 10 miles away, such as being disposed in the same county, in the same city, in the same metropolitan area, or within the same zone of a shipping service provider) providing a possibility for the acquirer to pick up items from the intermediary stocking location personally or personnel of the intermediary stocking location providing delivery of items to the acquirer location, and providing an opportunity for a ride sharing service to provide delivery of items to the acquirer location. The foregoing fulfilment options facilitate providing same day delivery of goods to the acquirer location. Further, situations in which the intermediary stocking location is disposed relatively near the acquirer location may enable a shipping service provider to provide economical (e.g., intra-zone or adjacent zone shipping rates, possibly without surcharge for expedited delivery) delivery of goods to the acquirer location.

As can be appreciated from the foregoing, the relative proximity of certain ones of the intermediary stocking locations can provide appreciable advantages, as compared to the supplier location, with respect to procurement times and/or expense associated with goods procured by an acquirer from a supplier. Accordingly, embodiments of the present invention are configured to utilize virtual distribution center inventory provided by intermediary stocking locations in providing localized item procurement fulfilment according to the concepts herein.

FIG. 3 shows flow 300 providing operation according to embodiments of the invention for localized item procurement fulfilment in accordance with the concepts herein. In operation of the illustrated embodiments of flow 300, an acquirer initiates a transaction for purchase of goods from the supplier at block 301. For example, an acquirer may utilize acquirer system 121 (e.g., using an appropriate user interface, such as provided by a web browser, local client application, applet, etc.) to access a web based sales platform hosted by supplier system 111 for purchasing items of the suppliers goods. The acquirer may indicate a selection one or more items of the supplier's goods for purchase and delivery to the acquirer in the transaction. Moreover, as part of the transaction processing the acquirer may provide various information useful in facilitating procurement of the items of the supplier's goods, such as to provide account information (e.g., a customer account proving payment information, shipping address information, shipping and/or delivery preference information, etc.), payment (e.g., electronic funds transfer, online payment, etc.), shipping/acquisition information (e.g., desired time period for delivery, shipping service provider selection, special services selection/preference, etc.), and/or the like.

In operation according to the illustrated embodiment, a determination is made at block 302 as to whether virtual distribution center inventory suitable for use in the transaction is available. For example, supplier system 111 may interact with localized item procurement fulfilment system 131 to determine if one or more items of the goods to be purchased by the acquirer are available in stock at an appropriately located stocking location. In operation according to embodiments, supplier system 111 may provide information regarding items requested by the acquirer, the location of the acquirer, shipping and/or delivery preferences or parameters for the acquirer, etc. to localized item procurement fulfilment system 131 for use in determining if suitable virtual distribution center inventory is available for use in the acquirer's transaction. For example, logic of localized item procurement fulfilment system 131 may utilize information (e.g., as may be stored in database 132 and/or available through access to one or more of the intermediary's systems, such as ERP, POS, and inventory management systems, such as using access information, credentials, etc. previously provided by the intermediary, as may be stored in database 132) regarding items of the supplier's goods stocked at various intermediary stocking locations to determine if items of goods matching those selected by the acquirer are available (e.g., stocked in sufficient quantity so as to be in excess of any applicable minimum threshold for a particular stocking location) and can meet the acquirer's procurement preferences/requirements (e.g., delivery timeframe, special shipping/delivery services, etc.). In operation according to embodiments, one or more of intermediary systems 141a and 141b may provide localized item procurement fulfilment system 131 with inventory information, such as via an API or other interface, in real-time or near real-time as transactions are processed affecting the quantities of the items to facilitate supplier system 111 and localized item procurement fulfilment system 131 performing localized item procurement fulfilment functionality in a single real-time session (e.g., avoiding the supplier system initiating a fulfilment transaction and thereafter waiting an appreciable amount of time for the localized item procurement fulfilment system to determine if virtual distribution center inventory is available for the transaction, whereby the supplier system may only then complete processing of the transaction), thereby providing improved, efficient, and real-time computing resource utilization. Moreover, operation according to the foregoing embodiments facilitates presenting options to the acquirer, such as by a user interface of acquirer system 121, during the acquisition transaction, thereby providing increased user satisfaction as well as improved (reduced) communication resource utilization.

Where, for example, the acquirer indicates acquirer location 120 for delivery of supplier's goods in the transaction, logic of localized item procurement system 131 of embodiments may identify one or more intermediary stocking locations for one or more intermediaries that are located very near, near, and/or even relatively near acquirer location 120 (e.g., depending upon the proximity to the acquirer supporting delivery within a specified delivery timeframe) as candidate stocking locations for providing virtual distribution center inventory for use in the transaction. Logic of localized item procurement system 131 of embodiments may analyze information for one or more candidate stocking locations (e.g., as may be stored in database 132) to determine whether items of goods matching those selected by the acquirer are available for use in localized item procurement fulfilment and whether use of the particular stocking location will otherwise meet parameters of the transaction. For example, logic of localized item procurement fulfilment system 131 may analyze information regarding the location of the candidate stocking locations relative to the acquirer location, the available routes between candidate stocking locations and the acquirer location, the shipping services available from the candidate stocking locations, the capabilities and/or timeline for intermediary personnel of the candidate stocking locations preparing items of the goods for providing to an acquirer, shipper pick-up schedules at the candidate stocking locations, the hours of operation of the candidate stocking location, and/or the like to determine if items of the supplier's goods stocked at one or more intermediary stocking location may be used to meet procurement fulfilment parameters for the transaction. Localized procurement fulfilment system 131 may provide information indicating whether virtual distribution center inventory suitable for use in the transaction is available to supplier system 111 to direct further processing with respect to the transaction for purchase of goods from the supplier by the acquirer.

In accordance with the illustrated embodiment of flow 300, if it is determined at block 302 that virtual distribution center inventory suitable for use in the transaction is not available processing proceeds to block 306 wherein further processing with respect to the transaction for purchase of goods from the supplier is performed so that items of the goods are fulfilled using supplier inventory. For example, one or more items of goods 112 stocked at supplier location 110 meeting the goods selected by the acquirer may be utilized to fulfil the transaction. Items of goods 112 purchased from the supplier by the acquirer may, for example, be shipped from supplier location 110 to acquirer location 120 (e.g., as designated by the acquirer in their order of the items) via any number of suitable means, such as shipping service provider 161 (e.g., USPS, UPS, FedEx, commercial trucking company, air freight service, rail-freight company, etc.).

However, if it is determined at block 302 that virtual distribution center inventory suitable for use in the transaction is available processing proceeds to block 303 wherein further processing with respect to the transaction for purchase of goods from the supplier is performed so that items of the goods are fulfilled using virtual distribution center inventory. For example, it may be determined that sufficient quantity of items of the supplier's goods are available at intermediary stocking location 141a disposed in very near, near, or relatively near proximity to acquirer location and thus processing proceeds to facilitate localized item procurement fulfilment using virtual distribution center inventory comprising items of goods 142a stocked at intermediary stocking location 140a.

Processing with respect to the transaction for purchase of goods from the supplier performed at block 303 to facilitate items of the goods being fulfilled using virtual distribution center inventory may, for example, comprise offering the acquirer fulfilment using localized item procurement fulfilment. In operation according to embodiments, a web based sales platform hosted by supplier system 111 of embodiments may provide an indication to the acquirer that localized item procurement fulfilment is available with respect to one or more items of the supplier's goods being purchased by the acquirer. As one example, fulfilment options suitable for use in fulfilling the transaction (e.g., each suitable fulfilment option, fulfilment options meeting one or more preference of the acquirer, a least expensive fulfilment option, etc.), possibly including one or more supplier fulfilled options (e.g., shipping of items of goods 112 from shipper location 110) and/or one or more virtual distribution center inventory fulfilled options (e.g., shipping of items of goods 142a from intermediary location 140a, acquirer pick-up of items of goods 142a at intermediary location 140a, etc.) may be presented to the acquirer, such as by a user interface of acquirer system 121. In operation according to embodiments, a supplier may elect not to present supplier fulfilled options where one or more virtual distribution center inventory fulfilled options are available, such as to encourage intermediaries establishing channels for the distribution of that supplier's without fear by the intermediaries that their time and expense in stocking goods for local availability will be undercut by direct sales by the supplier.

When the fulfilment options suitable for use in fulfilling the transaction presented to the acquirer include one or more virtual distribution center inventory fulfilled options, the virtual distribution center inventory fulfilled options may or may not be designated as such to the acquirer. For example, virtual distribution center inventory fulfilled options may be distinguished from supplier fulfilled options presented to the acquirer to allow the acquirer to select sourcing of items of the goods from the supplier or from an intermediary. Alternatively, supplier fulfilled options and virtual distribution center inventory fulfilled options may not be distinguished so as to provide no indication regarding the sourcing of items of the goods.

Examples of the virtual distribution center inventory fulfilment options offered to the acquirer where intermediary stocking location 141a providing virtual distribution center inventory is disposed very near acquirer location 120 may include same day, on-demand (e.g., less than 1 hour), and near on-demand (e.g., 2 hour or 1 hour) delivery/acquisition of goods (e.g., fulfilment options such as the acquirer picks up items from the intermediary stocking location personally, personnel of the intermediary stocking location delivering items to the acquirer location, and a ride sharing service to delivering items to the acquirer location) as well as economical shipping service provider services providing timely delivery of goods (e.g., fulfilment options such as a shipping service provider providing two day, overnight, or same day delivery service at local or intra-zone shipping rates, without surcharge for expedited delivery). As a further example, where intermediary stocking location 141a providing virtual distribution center inventory is disposed near acquirer location 120, the virtual distribution center inventory fulfilment options offered to the acquirer may include same day and near on-demand (e.g., 2 hour or 1 hour) delivery/acquisition of goods (e.g., fulfilment options such as the acquirer picks up items from the intermediary stocking location personally, personnel of the intermediary stocking location delivering items to the acquirer location, and a ride sharing service delivering items to the acquirer location) as well as economical shipping service provider services providing timely delivery of goods (e.g., fulfilment options such as a shipping service provider providing two day, overnight, or same day delivery service at local or intra-zone shipping rates, without surcharge for expedited delivery). As a still further example, where intermediary stocking location 141a providing virtual distribution center inventory is disposed relatively near acquirer location 120, the virtual distribution center inventory fulfilment options offered to the acquirer may include same day delivery/acquisition of goods (e.g., fulfilment options such as the acquirer picks up items from the intermediary stocking location personally, personnel of the intermediary stocking location delivering items to the acquirer location, and a ride sharing service delivering items to the acquirer location) as well as economical shipping service provider services providing timely delivery of goods (e.g., fulfilment options such as a shipping service provider providing two day or overnight delivery service at local or intra-zone shipping rates, without surcharge for expedited delivery).

It should be appreciated that, although the above examples of virtual distribution center inventory fulfilment delivery options provide for delivery of items of the supplier's goods to the acquirer location, embodiments herein may provide for delivery to locations other than the acquirer's location. For example, various of the virtual distribution center inventory fulfilment delivery options (e.g., personnel of the intermediary stocking location delivering items to the acquirer location, a ride sharing service to delivering items to the acquirer location, and a shipping service provider providing delivery service) may provide delivery of items of the supplier's goods to a locker or other pickup point local to the acquirer, such as for pick up at the convenience of the acquirer.

Having presented one or more fulfilment options suitable for use in fulfilling the transaction to the acquirer at block 303, processing according to the illustrated embodiment of flow 300 proceeds to block 304 wherein a determination is made as to whether a localized item procurement fulfilment option is selected for fulfilling the transaction. For example, the acquirer may utilize acquirer system 121 to indicate a selection of a fulfilment option (e.g., selecting a particular one of a plurality of fulfilment options presented, selecting a sole presented fulfilment option as being acceptable, etc.) to a web based sales platform hosted by supplier system 111.

In accordance with the illustrated embodiment of flow 300, if it is determined at block 304 that a fulfilment option using virtual distribution center inventory has not been selected processing proceeds to block 306 wherein further processing with respect to the transaction for purchase of goods from the supplier is performed so that items of the goods are fulfilled using supplier inventory. For example, one or more items of goods 112 stocked at supplier location 110 meeting the goods selected by the acquirer may be utilized to fulfil the transaction and items shipped from supplier location 110 to acquirer location 120 as described above.

However, if it is determined at block 304 that a fulfilment option using virtual distribution center inventory has been selected processing proceeds to block 305 wherein further processing with respect to the transaction for purchase of goods from the supplier is performed so that items of the goods are fulfilled using virtual distribution center inventory. For example, it may be determined that a fulfilment option selected by the acquirer, or as otherwise to be utilized in fulfilling the transaction, is to utilize virtual distribution center inventory provided by items of the supplier's goods at intermediary stocking location 141a and thus processing proceeds to facilitate fulfilment of the transaction by the intermediary using items of goods 142a and/or facilitate remittance for the items to the intermediary. Accordingly, a determination at block 304 that virtual distribution center inventory is to be used to fulfil an item acquisition transaction operates to override the sequence of events conventionally implemented when an acquirer interacts directly with the supplier to procure the manufacturer's goods (i.e., items of the goods are fulfilled using supplier inventory) to instead fulfill items of the goods from one or more intermediary stocking locations for providing localized item procurement fulfilment to acquirers.

Operation at block 305 according to embodiments of the invention provides for reserving the appropriate items of the supplier's goods from the stock at the appropriate intermediary stocking location, initiating picking of the items from the stock for shipping or pick up by the acquirer, facilitating preparing of the items for shipping or pickup, etc. For example, supplier system 111 may interact with localized item procurement fulfilment system 131 to designate the items of the supplier's goods from goods 142a at intermediary stocking location 140a as reserved for fulfilling the acquirer's transaction. In operation for reserving the appropriate items of the supplier's goods from the stock at the appropriate intermediary stocking location according to embodiments, localized item procurement fulfilment system 131 may access (e.g., using access information, credentials, etc. previously provided by the intermediary, as may be stored in database 132, and/or APIs, portals, etc. previously enabled by the intermediary) one or more of the intermediary's systems, such as ERP, POS, and inventory management systems, to designate an appropriate quantity of items as reserved or held for localized item procurement fulfilment. Additionally or alternatively, communication outside of such inventory information management systems may be utilized in reserving the appropriate items, such as by localized item procurement fulfilment system 131 providing a text message, email message, fax, or other communication to intermediary stocking location 140a and/or appropriate personnel associated therewith. In operation for initiating picking of the items from the stock for shipping or pick up by the acquirer according to embodiments, localized item procurement fulfilment system 131 may access one or more of the intermediary's system resources, such as ERP, POS, and inventory management system, and/or one or more devices of the intermediary, such as a printer, a pick-ticket scheduler, etc., to cause picking and packing instructions to be presented, to initiate printing of pick tickets, packing lists, etc. at intermediary stocking location 140a. Additionally or alternatively, communications provided by localized item procurement fulfilment system 131 to intermediary stocking location 140a and/or appropriate personnel associated therewith, such as the above described text messages, email messages, faxes, etc., may be utilized for initiating picking of the items from the stock for shipping or pick up by the acquirer (e.g., to notify personnel to pick items of the goods, to provide instructions regarding handling or holding items of the goods for acquisition by the acquirer, etc.). In operation for facilitating preparing of the items for shipping or pick up by the acquirer according to embodiments, localized item procurement fulfilment system 131 may access one or more of the intermediary's system resources, such as ERP, POS, and inventory management system, and/or one or more devices of the intermediary, such as printer, shipping label generator/printer, and pick-ticket scheduler, to initiate printing of invoices, shipping labels, packing lists, etc. at intermediary stocking location 140a. Additionally or alternatively, communications provided by localized item procurement fulfilment system 131 to intermediary stocking location 140a and/or appropriate personnel associated therewith, such as the above described text messages, email messages, faxes, etc., may be utilized for facilitating preparing of the items for shipping or pick up by the acquirer (e.g., to notify personnel to provide items of the goods to the acquirer or a driver of a ride sharing service when they present themselves at the stocking location, to provide instructions shipping items of the goods to the acquirer, etc.).

Operation at block 305 according to embodiments of the invention additionally or alternatively provides for transparent and seamless order processing with respect to items of the supplier's goods fulfilled from the stock at the appropriate intermediary stocking location. For example, supplier system 111 may interact with acquirer system 121 to implement a web based sales platform checkout process for the supplier's sale of goods wherein the acquirer tenders payment for the transaction. Where items of the goods are to be fulfilled using virtual distribution center inventory, supplier system 111 may operate to facilitate remittance or compensation to the intermediary for items of the goods procured by the acquirer in the localized item procurement fulfilment. For example, supplier system 111 may interact with localized item procurement fulfilment system 131 to perform a checkout process that directs payment to the intermediary's account for items of the supplier's goods purchased by the acquirer that are to be fulfilled out of the intermediary's stocking location. In operation for performing a checkout process that directs payment to the intermediary's account according to embodiments, localized item procurement fulfilment system 131 may utilize intermediary account information (e.g., deposit account information, electronic funds transfer information, online payment account information, etc.) to make payment to the intermediary as part of an electronic commerce transaction implemented by a web based sales platform of supplier system 111. Additionally or alternatively, transparent and seamless order processing may be provided with respect to the payment for items of the supplier's goods fulfilled from goods 142a using a checkout process integrated with one or more of the intermediary's systems, such as ERP, POS, and inventory management systems. In operation according to embodiments, localized item procurement fulfilment system 131 provides integration between supplier system 111 and intermediary system 141a whereby the acquirer checking out through a web based sales platform hosted by the supplier system performs checkout processing using the checkout process of intermediary system 141a (e.g., an API enabled by the intermediary may be utilized to enable remote checkout processing functionality of the intermediary available to the acquirer via the supplier system). Order processing with respect to items of the supplier's goods fulfilled from the stock of the intermediary's stocking location may additionally or alternatively include communication outside of such an integrated checkout process, such as by supplier system 111 and/or localized item procurement fulfilment system 131 providing a text message, email message, fax, or other communication providing transaction processing information (e.g., purchase order, automated clearing house (ACH) payment processing confirmation, statement of account, etc.) to intermediary stocking location 140a and/or appropriate personnel associated therewith. The checkout process may, for example, provide for a supplier credit to the intermediary rather than a transfer of funds to the intermediary as part of the checkout process implemented according to embodiments.

Further, operation at block 305 of embodiments herein provides functionality for facilitating pickup and/or delivery of items of the supplier's goods from the stock at the intermediary stocking location. For example, where the acquirer elects to pick up items of the supplier's goods from the intermediary's stocking location, supplier system 111 and/or localized item procurement fulfilment system 131 may provide information to facilitate the acquirer picking up the items, such as by providing information (e.g., the address of the appropriate stocking location, directions from the acquirer location to the appropriate stocking location, hours of operation for making the pickup, proof of payment for obtaining the purchased items, etc.) to acquirer system 121 as part of the purchase transaction. Additionally or alternatively, communication outside of the acquirer system interaction in the purchase transaction, such as providing a text message, email message, fax, or other communication directed to the acquirer, may be provided for facilitating the acquirer picking up the items.

Where the fulfilment of the purchase transaction provides for delivery of items of the suppliers goods to the acquirer from the intermediary's stocking location (i.e., localized item procurement fulfilment using virtual distribution center inventory provided by the intermediary's stocking location), the functionality provided by operation at block 305 may include supplier system 111 and/or localized item procurement fulfilment system 131 providing information to the intermediary and/or one or more third party to facilitate delivery of items of the goods from the intermediary's stocking location to the acquirer's location. For example, where items of the supplier's goods are to be delivered by intermediary personnel (e.g., using personal conveyance 161), supplier system 111 and/or localized item procurement fulfilment system 131 may provide information (e.g., the address of the acquirer location or locker or other acquirer pickup point, directions from the stocking location to the acquirer location or locker or other acquirer pickup point, requested delivery timeframe, hours of availability of the acquirer, packing list, etc.) to intermediary system 141a for facilitating delivery of items of the supplier's goods from the stock at the intermediary stocking location. Similarly, where items of the supplier's goods are to be delivered by third party personnel (e.g., a ride share service or courier service using service vehicle 162, a shipping service provider, commercial trucking company, air freight service, or railfreight company using rolling stock 163, etc.), supplier system 111 and/or localized item procurement fulfilment system 131 may provide information (e.g., dispatch request for the shipment, shipping label information, proof of payment/postage indicium information, the address of the acquirer location or locker or other acquirer pickup point, requested delivery timeframe, etc.) to one or more third party system (e.g., shipping services system, not shown) for facilitating delivery of items of the supplier's goods from the stock at the intermediary stocking location. Communications in addition or in the alternative to the examples above may be utilized for facilitating delivery of items of the supplier's goods, such as providing text messages, email messages, faxes, or other communications directed to the intermediary personnel, third party delivery personnel, etc.

It should be appreciated that facilitating delivery of items of the supplier's goods at block 305 of embodiments may comprise functionality in addition to or in the alternative to the above described exemplary information communication. For example, supplier system 111 and/or localized item procurement fulfilment system 131 may operate to provide payment to a delivery service provider, intermediary personnel providing the delivery, etc. In operation according to embodiments, localized item procurement fulfilment system 131 may interface with one or more shipping service payment system, such as a postage indicia system (e.g., the Internet based postage on demand system provided by Stamps.com Inc.), to provide for delivery service payment.

As can be appreciated from the foregoing exemplary operation according to flow 300 of the illustrated embodiment of FIG. 3, embodiments of the localized item procurement fulfilment configuration illustrated in FIG. 1 utilize inventory stocked by an intermediary as virtual distribution center inventory for the purchase transaction initiated using the acquirer system and supplier system. Accordingly, items of the supplier's goods distributed throughout a network of intermediaries that stock inventory may be utilized to provide fulfilment of the items that is localized with respect to acquirers, despite the supplier's own origination location for fulfilling orders being remote with respect to the acquirers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
storing, by a supplier system, information from intermediary suppliers regarding election to allow items of a supplier's goods stocked at intermediary stocking locations of the intermediary suppliers to be used as virtual distribution center inventory, one or more accounts of the intermediary suppliers, and inventory of intermediary stocking locations of the intermediary suppliers, wherein the supplier comprises a manufacturer of the supplier's goods and the intermediary suppliers comprise independent resellers of the supplier's goods, and wherein the information regarding inventory of intermediary stocking locations of the intermediary suppliers is provided by the intermediary suppliers in real-time as transactions are processed affecting quantities of the items of the supplier's goods;
analyzing a web based direct sales platform purchase transaction between the supplier and an acquirer purchasing one or more items of the supplier's goods, the information regarding inventory of intermediary stocking locations of the intermediary suppliers, and the information regarding election to allow items of the supplier's goods to be used as virtual distribution center inventory;
offering the acquirer, during the web based direct sales platform purchase transaction, a localized item procurement fulfilment option for localized item procurement fulfilment of at least one item of the one or more items of the supplier's goods based upon the analyzing indicating that virtual distribution center inventory suitable for use in the web based direct sales platform purchase transaction is available; and
converting, during the web based direct sales platform purchase transaction, the web based direct sales platform purchase transaction to processing fulfilment of the web based direct sales platform purchase transaction using the at least one item of the one or more items of the supplier's goods stocked at an intermediary stocking location of a selected intermediary supplier of the intermediary suppliers, instead of using inventory of the supplier, based upon the acquirer selecting the localized item procurement fulfilment during the web based direct sales platform purchase transaction, wherein converting the web based direct sales platform purchase transaction to processing fulfilment of the web based direct sales platform purchase transaction using the at least one item of the one or more items of the supplier's goods stocked at an intermediary stocking location overrides a sequence of events otherwise implemented when the acquirer interacts with the supplier to procure the supplier's goods to instead fulfill the least one item of the one or more items of the supplier's goods stocked at the intermediary stocking location for providing the localized item procurement fulfilment to the acquirer, at least in part, by:
performing a checkout process that directs payment to an account of the selected intermediary supplier, identified in the information regarding one or more accounts of the intermediary suppliers, for the at least one item; and
communicating one or more messages regarding the localized item procurement fulfilment to the selected intermediary supplier so that the at least one item of the one or more items of the supplier's goods are fulfilled from virtual distribution center inventory provided by the intermediary stocking location of the selected intermediary supplier.

2. The method of claim 1, wherein the information regarding election to allow items of the supplier's goods to be used as virtual distribution center inventory includes information regarding subsets of the supplier's goods that are available for use as the virtual distribution center inventory, wherein the information regarding the subsets of the supplier's goods includes at least one of a threshold minimum item inventory for availability as virtual distribution center inventory, particular types of items of the supplier's goods an intermediary supplier elects to make available as virtual distribution center inventory, or maximum item inventory turnover rate for item availability as virtual distribution center inventory.

3. The method of claim 2, wherein the analyzing comprises:
determining if inventory of the intermediary suppliers meets the information regarding subsets of the supplier's goods that are available for use as the virtual distribution center inventory.

4. The method of claim 1, wherein the analyzing comprises:
determining if items of goods matching the one or more items of the supplier's goods are available as virtual distribution center inventory;
determining whether proximity of an intermediary stocking location to a location of the acquirer supports delivery within a specified delivery timeframe; and
determining that there is virtual distribution center inventory suitable for providing the localized item procurement fulfilment of the one or more items of the supplier's goods based at least in part on determining items of goods matching the one or more items of the supplier's goods are available as virtual distribution center inventory and determining proximity of an intermediary stocking location to the location of the acquirer supports delivery within the specified delivery timeframe.

5. The method of claim 1, wherein the one or more messages regarding the localized item procurement fulfilment communicated to the selected intermediary supplier initiates picking of the one or more items of the supplier's goods from stock at an intermediary stocking location for shipping to or pick up by the acquirer.

6. The method of claim 5, wherein the processing fulfilment of the web based direct sales platform purchase transaction using the at least one item of the one or more items of the supplier's goods stocked at the intermediary stocking location of the selected intermediary supplier includes accessing a system resource of the selected intermediary supplier to provide picking and packing instructions to be provided to personnel of the intermediary stocking location.

7. The method of claim 1, wherein the one or more messages regarding the localized item procurement fulfilment communicated to the selected intermediary supplier reserves appropriate items of the supplier's goods from stock at a selected intermediary stocking location for fulfilling the web based direct sales platform purchase transaction.

8. The method of claim 7, wherein the processing fulfilment of the web based direct sales platform purchase transaction using the at least one item of the one or more items of the supplier's goods stocked at an intermediary stocking location of the selected intermediary supplier includes accessing an inventory management system of the selected intermediary supplier to designate an appropriate quantity of items as reserved for localized item procurement fulfilment.

9. The method of claim 1, wherein the one or more messages regarding the localized item procurement fulfilment communicated to the selected intermediary supplier facilitates preparing the at least one item of the one or more items of the supplier's goods for shipping or pickup.

10. The method of claim 9, wherein the processing fulfilment of the web based direct sales platform purchase transaction using the at least one item of the one or more items of the supplier's goods stocked at an intermediary stocking location of the selected intermediary supplier includes accessing a system resource of the selected intermediary supplier to print at least one of a shipping label or a packing list at the intermediary stocking location.

11. The method of claim 1, wherein the one or more messages regarding the localized item procurement fulfilment communicated to the selected intermediary supplier provides information to personnel of the selected intermediary supplier to facilitate delivery of the at least one item of the one or more items of the supplier's goods from the intermediary stocking location to a location of the acquirer.

12. The method of claim 11, wherein the processing fulfilment of the web based direct sales platform purchase transaction using the at least one item of the one or more items of the supplier's goods stocked at an intermediary stocking location of the selected intermediary supplier includes providing information to a third party to facilitate delivery of the one or more items of the supplier's goods from the intermediary stocking location to the location of the acquirer.

13. A system comprising:

a supplier system database storing information from intermediary suppliers regarding election to allow items of a supplier's goods stocked at intermediary stocking locations of the intermediary suppliers to be used as virtual distribution center inventory, one or more accounts of the intermediary suppliers, and inventory of intermediary stocking locations of the intermediary suppliers, wherein the supplier comprises a manufacturer of the supplier's goods and the intermediary suppliers comprise independent resellers of the supplier's goods, and wherein the information regarding inventory of intermediary stocking locations of the intermediary suppliers is provided by the intermediary suppliers in real-time as transactions are processed affecting quantities of the items of the supplier's goods; and a supplier system configured to:

analyze a web based direct sales platform purchase transaction between the supplier and an acquirer purchasing one or more items of the supplier's goods, the information regarding inventory of intermediary stocking locations of the intermediary suppliers, and the information regarding election to allow items of the supplier's goods to be used as virtual distribution center inventory;

offer the acquirer, during the web based direct sales platform purchase transaction, a localized item procurement fulfilment option for localized item procurement fulfilment of at least one item of the one or more items of the supplier's goods based upon the analyzing indicating that virtual distribution center inventory suitable for use in the web based direct sales platform purchase transaction is available; and convert, during the web based direct sales platform purchase transaction, the web based direct sales platform purchase transaction to process fulfilment of the web based direct sales platform purchase transaction using the at least one item of the one or more items of the supplier's goods stocked at an intermediary stocking location of a selected intermediary supplier of the intermediary suppliers, instead of using inventory of the supplier, based upon the acquirer selecting the localized item procurement fulfilment during the web based direct sales platform purchase transaction, wherein converting the web based direct sales platform purchase transaction to processing fulfilment of the web based direct sales platform purchase transaction using the at least one item of the one or more items of the supplier's goods stocked at an intermediary stocking location overrides a sequence of events otherwise implemented when the acquirer interacts with the supplier to procure the supplier's goods to instead fulfill the least one item of the one or more items of the supplier's goods stocked at the intermediary stocking location for providing the localized item procurement fulfilment to the acquirer, and wherein the supplier system configured to fulfill the least one item of the one or more items of the supplier's goods stocked at the intermediary stocking location for providing the localized item procurement fulfilment to the acquirer is configured, at least in part, to:

perform a checkout process that directs payment to an account of the selected intermediary supplier, identified in the information regarding one or more accounts of the intermediary suppliers, for the at least one item; and communicate one or more messages regarding the localized item procurement fulfilment to the selected intermediary supplier so that the at least one item of the one or more items of the supplier's goods are fulfilled from virtual distribution center inventory provided by the intermediary stocking location of the selected intermediary supplier.

14. The system of claim 13, wherein the information regarding election to allow items of the supplier's goods to be used as virtual distribution center inventory includes information regarding subsets of the supplier's goods that are available for use as the virtual distribution center inventory, wherein the information regarding the subsets of the supplier's goods includes at least one of a threshold minimum item inventory for availability as virtual distribution center inventory, particular types of items of the supplier's goods an intermediary supplier elects to make available as virtual distribution center inventory, or maximum item inventory turnover rate for item availability as virtual distribution center inventory.

15. The system of claim 14, wherein the supplier system configured to analyze the web based direct sales platform purchase transaction is configured to:
   determine if inventory of the intermediary suppliers meets the information regarding subsets of the supplier's goods that are available for use as the virtual distribution center inventory.

16. The system of claim 13, wherein the supplier system configured to analyze the web based direct sales platform purchase transaction is configured to:
   determine if items of goods matching the one or more items of the supplier's goods are available as virtual distribution center inventory;
   determine whether proximity of an intermediary stocking location to a location of the acquirer supports delivery within a specified delivery timeframe; and
   determine that there is virtual distribution center inventory suitable for providing the localized item procurement fulfilment of the one or more items of the supplier's goods based at least in part on determining items of goods matching the one or more items of the supplier's goods are available as virtual distribution center inventory and determining proximity of an intermediary stocking location to the location of the acquirer supports delivery within the specified delivery timeframe.

17. The system of claim 13, wherein the one or more messages regarding the localized item procurement fulfilment communicated to the selected intermediary supplier initiates picking of the one or more items of the supplier's goods from stock at an intermediary stocking location for shipping to or pick up by the acquirer.

18. The system of claim 17, wherein the supplier system configured to process fulfilment of the web based direct sales platform purchase transaction using the at least one item of the one or more items of the supplier's goods stocked at the intermediary stocking location of the selected intermediary supplier is configured to:

access a system resource of the selected intermediary supplier to provide picking and packing instructions to be provided to personnel of the intermediary stocking location.

19. The system of claim 13, wherein the one or more messages regarding the localized item procurement fulfilment communicated to the selected intermediary supplier reserves appropriate items of the supplier's goods from stock at a selected intermediary stocking location for fulfilling the web based direct sales platform purchase transaction.

20. The system of claim 19, wherein the supplier system configured to process the web based direct sales platform purchase transaction to facilitate fulfilment of the one or more items of the supplier's goods using the at least one item of the one or more items of the supplier's goods stocked at an intermediary stocking location of the selected intermediary supplier is configured to:
   access an inventory management system of the selected intermediary supplier to designate an appropriate quantity of items as reserved for localized item procurement fulfilment.

21. The system of claim 13, wherein the one or more messages regarding the localized item procurement fulfilment communicated to the selected intermediary supplier facilitates preparing the at least one item of the one or more items of the supplier's goods for shipping or pickup.

22. The system of claim 21, wherein the supplier system configured to process the web based direct sales platform purchase transaction to facilitate fulfilment of the one or more items of the supplier's goods using the at least one item of the one or more items of the supplier's goods stocked at an intermediary stocking location of the selected intermediary supplier is configured to:
   access a system resource of the selected intermediary supplier to print at least one of a shipping label or a packing list at the intermediary stocking location.

23. The system of claim 13, wherein the one or more messages regarding the localized item procurement fulfilment communicated to the selected intermediary supplier provides information to personnel of the selected intermediary supplier to facilitate delivery of the at least one item of the one or more items of the supplier's goods from the intermediary stocking location to a location of the acquirer.

24. The system of claim 23, wherein the supplier system configured to process the web based direct sales platform purchase transaction to facilitate fulfilment of the one or more items of the supplier's goods using the at least one item of the one or more items of the supplier's goods stocked at an intermediary stocking location of the selected intermediary supplier is configured to:
   provides information to a third party to facilitate delivery of the one or more items of the supplier's goods from the intermediary stocking location to the location of the acquirer.

* * * * *